United States Patent

Kloppenburg et al.

[11] Patent Number: 5,787,800
[45] Date of Patent: Aug. 4, 1998

[54] OVEN AND METHOD FOR BAKING MOLDINGS BY MEANS OF AIR HEATING

[75] Inventors: Wiebe Kloppenburg, Deventer; Johan Hendrix Adolf Arentsen, Lochem, both of Netherlands

[73] Assignee: Suntray B.V., Netherlands

[21] Appl. No.: 633,826

[22] PCT Filed: Sep. 1, 1995

[86] PCT No.: PCT/NL95/00296

§ 371 Date: Aug. 19, 1996

§ 102(e) Date: Aug. 19, 1996

[87] PCT Pub. No.: WO96/06534

PCT Pub. Date: Mar. 7, 1996

[30] Foreign Application Priority Data

Sep. 1, 1994 [NL] Netherlands ............... 9401427

[51] Int. Cl.⁶ .................. A21B 1/26; A21B 5/02
[52] U.S. Cl. ............... 99/475; 99/479; 426/523; 126/21 A
[58] Field of Search ............... 99/373, 374, 426, 99/427, 443 C, 475, 474, 477, 479; 126/21 A; 426/523

[56] References Cited

U.S. PATENT DOCUMENTS

| 2,624,297 | 1/1953 | Nuttall | 99/373 |
| 4,648,314 | 3/1987 | Plicht et al. | 99/373 |
| 4,991,497 | 2/1991 | Barkhau et al. | 99/427 X |
| 5,180,898 | 1/1993 | Alden et al. | 99/443 C X |
| 5,544,570 | 8/1996 | Haas et al. | 99/477 X |

FOREIGN PATENT DOCUMENTS

| 2448902 | 8/1976 | German Dem. Rep. . |
| 3346970 | 7/1985 | German Dem. Rep. . |

OTHER PUBLICATIONS

PCT Document WO 89/00393, Jan. 1989, United States.

*Primary Examiner*—Reginald L. Alexander
*Attorney, Agent, or Firm*—Michaelson & Wallace; Peter L. Michaelson; John C. Pokotylo

[57] ABSTRACT

In a baking space of an oven, baking molds filled with dough or a dough suspension to form moldings by forcibly passing heated air over the baking molds. The heated air is heated at a location external to the baking space.

11 Claims, 4 Drawing Sheets

5,787,800

1

OVEN AND METHOD FOR BAKING MOLDINGS BY MEANS OF AIR HEATING

BACKGROUND OF THE INVENTION a. Field of the Invention

This invention relates to a baking oven comprising a number of baking molds for baking moldings, for instance from a dough or a dough suspension, with heating means being provided for heating the baking molds.

b. Related Art

To bake moldings from a dough or a dough suspension, for instance wafers or dish products, a suitable amount of dough is introduced into baking molds defining the suitable baking form or baking forms, whereafter the baking mold is heated in an oven. The or each, molding is then baked and after baking removed from the baking mold, whereafter the baking mold is filled again. In this manner a large number of moldings can be baked at a relatively high rate.

A row of gas burners are usually arranged under the baking molds for heating the baking molds. As a result, parts of the baking molds become relatively hot with respect to other parts of the baking mold. This is particularly disadvantageous because it may give rise to heat damage of the baking molds, such as for instance rupture and increased wear. Moreover, as a consequence, the quality of the baked moldings is adversely affected. For example, the difference in temperature in the baking mold may cause cracks to form in the molding. Further, the heating and cooling of the baking molds require relatively much time and much energy is lost in that the baking molds have to be heated to a disproportionately high temperature with respect to the desired baking temperature within the baking mold. Moreover, a disadvantage of the use of gas burners with an open flame in a baking oven is that if the oven is soiled, for instance with dough or spilled products, the high-temperature heating of the baking molds gives rise to fire hazards in the oven, in particular when the gas burners are disposed at the bottom of the oven.

A further important disadvantage of heating the baking molds by means of gas burners arranged under the baking molds is that, in particular with baking molds where an upper section and a lower section thereof have clearly different heat contents, the difference in temperature of the baking molds is difficult to control, and certainly so when different baking forms are used. The energy supply will then have to be adapted to the baking molds with the least heat demand, which gives rise to a production loss in respect of the other molds because they cannot be optimally used. In addition, the energy efficiency of heating the baking molds by means of gas burners is low.

SUMMARY OF THE INVENTION

The invention accordingly contemplates a baking oven of the above-described type, whereby the above disadvantages are avoided, while the advantages are retained. To that end, the baking oven according to the invention is characterized in that the heating means comprise air heating means and air displacement means, the air displacement means being arranged for forcibly passing air heated with the air heating means along the baking molds within the oven.

Since air heating means are used and the heated air is forcibly passed along the baking molds, optimum heat transfer between the air and the baking molds can be provided for, while the air can simply be brought to an optimum temperature for that purpose. The baking molds will be heated by means of the heated air forcibly passed along them, in such a manner that each mold section is brought to the desired temperature, depending inter alia on the heat content thereof and the heat demand of the molding to be baked therein. Consequently, the temperature of the baking mold can be controlled within strict limits, so that only relatively small differences in temperature will occur. The baking molds and hence the products are therefore heated uniformly. Consequently, heat damage to the baking molds is prevented and the products are baked in optimum manner and without crack formation. Moreover, the baking molds no longer need to be locally heated to undesirably high temperatures and no open flames are present within the oven, whereby the fire hazards are effectively removed.

A further advantage of the use of the air heating means according to the invention is that the temperatures used can be adjusted more easily and faster, so that fluctuations in the oven and mold temperatures can be compensated more easily. As a result, higher production rates than with comparable baking molds heated by gas burners can be achieved. Moreover, qualitatively better products are obtained.

By forcing the heated air along the baking molds, the stagnant layer that forms around the baking molds can be passed relatively easily, so that a direct heating of the baking molds is obtained. As a result, an energetically efficient manner of heating is obtained, with a high efficiency, while moreover the temperatures are readily controllable. By controlling the air speed it is moreover possible to compensate for differences in heat transfer among different baking molds and mold parts. The baking oven according to the invention further has the advantage that it is clearly easier to install and service than the known baking ovens, owing in particular to the absence of the gas burners in the oven, and that the heating and cooling periods of the baking oven are considerably shortened.

In an advantageous embodiment, the baking oven according to the invention is characterized in that air recirculation means are included for returning to the air heating means at least a part and preferably substantially all of the heated air passed along the baking molds. By recirculating of the air from the oven, the heat supplied can be reused in a suitable manner, so that heat losses can be minimized. A baking oven according to the invention thus enables the baking of moldings in an energetically economic way.

In further elaboration, a baking oven according to the invention is characterized in that the air displacement means comprise at least one fan and at least one air supply duct connecting thereto. The air supply duct extends within the oven along at least a number of baking molds, and preferably along at least two sides thereof. Further, the air supply duct is provided with outlet openings, in such a manner that an air supply path extends from the air heating means, via the fan, at least a part of the air supply duct and a number of outlet openings, to the external surface of at least a number of baking molds.

In this embodiment, air can be supplied via each air supply duct by means of a fan. The air in use is blown through the outlet openings against the baking molds. In this way a well defined air supply path is provided, so that the heated air is passed to the baking molds in a uniform manner.

In further elaboration of the invention, the baking oven is a continuous travel oven arranged for passing the baking molds in succession along a guide track through the oven. The baking molds arranged in a linked series in the oven. Each baking mold comprises a first and a second mold section. The first mold section comprises guide means by which the baking molds can be guided over the guide track. A first air supply duct extends on the side of the first mold section and a second air supply duct extends on the side of the second mold section. The outlet openings are directed substantially transversely to the direction of travel.

Since an air supply duct extends along both sides of the baking molds, the baking molds can be heated optimally from two sides. The supply of heated air (amount, temperature, speed and the like) can therefore be controlled independently on both sides of the baking molds, so that the heat demand of the mold section in question can always be met. Moreover, the two mold sections are then heated simultaneously instead of one side only, as with the known baking ovens. Consequently, a relatively short heating path and/or a relatively high speed of travel of the baking molds will suffice, especially because of the good heat transfer which is the result of the forced air heating.

The outlet openings are preferably jet nozzle-shaped. Thus, in a simple manner it is ensured that the air is blown against the surfaces of the baking molds in the proper manner at a relatively high speed, without requiring the build-up of extreme pressure for that purpose. The outlet openings are uniformly distributed across the air ducts. Since the air is supplied at a sufficient speed, only a minimal pressure drop occurs within the air ducts.

The invention further relates to a method for baking moldings from dough or dough suspensions in baking molds in an oven, wherein during normal use of the oven an amount of dough or dough suspension is introduced into a baking mold, the baking mold is closed and is heated in the oven, in such a manner that the molding in the baking molds is baked, and then the baked molding is removed from the baking mold and the baking mold is refilled. The method is characterized according to the invention in that the baking mold is heated by means of forcibly fed heated air.

In a preferred embodiment of the method according to the invention, heated air is blown towards the baking molds from at least two sides, while the temperature of the blown air is controllable on each side and is adapted to at least the heat capacity of the side of the baking mold proximal to the relevant side of air approach and the heat demand of the molding to be baked. The speed of the blown air is set in such a manner that this air can at least substantially pass a stagnant layer forming around the baking molds and can heat the baking mold directly. The air blown into the oven, after heat exchange with the baking molds, is at least substantially discharged from the oven and is returned via air heating means to the blow side of the oven.

In this manner, a large number of moldings can be baked in an oven in an optimum, energetically economic way. Each mold section is brought to the proper temperature in optimum manner, so that the temperature differences around the mold cavities can be kept within very strict limits. This eliminates the risk of damage to the moldings during baking, so that little failure will occur in the practice of the method. By recirculating the heated air via the heating means, the residual heat of the air is reused, so that a high efficiency is achieved. Moreover, the heat consumption of the oven can be simply determined. By controlling both the air temperature and the flow velocity, the stagnant layer around the baking molds is passed by air that has a temperature that is adapted inter alia to the heat capacity of the mold sections in question and the heat transfer coefficient thereof, the contact time between the air and the mold surface and the heat demand of the moldings. Preferably, during the baking process additional air from outside the oven is supplied to provide that the temperature of the returned air is always lower than the minimum desired process air temperature, which supply can be simply achieved by utilizing leakage air.

In an advantageous embodiment of the method according to the invention, a series of mold cavities is defined in at least a number of baking molds, and depending on at least the mold temperature it is determined in each baking cycle which of the mold cavities is or are filled. As a result, it is possible, without requiring the baking oven to be stopped or any further measures to be taken, to further adjust the temperature of a baking mold. Since fewer mold cavities are filled, the baking mold is cooled only a little, so that the supplied heat will heat the baking mold faster than in the case of baking molds having more filled mold cavities. In a next cycle the baking mold in question then has a temperature again that is high enough not to disturb the baking process. This is of importance in particular with baking molds that have not been emptied completely after a cycle and have subsequently been filled again and have lost a great deal of heat as a result of this double filling.

BRIEF DESCRIPTION OF THE DRAWINGS

To clarify the invention, exemplary embodiments of a baking oven and a method for baking moldings will now be described with reference to the drawings. In the drawings.

DETAILED DESCRIPTION

Figure 1:
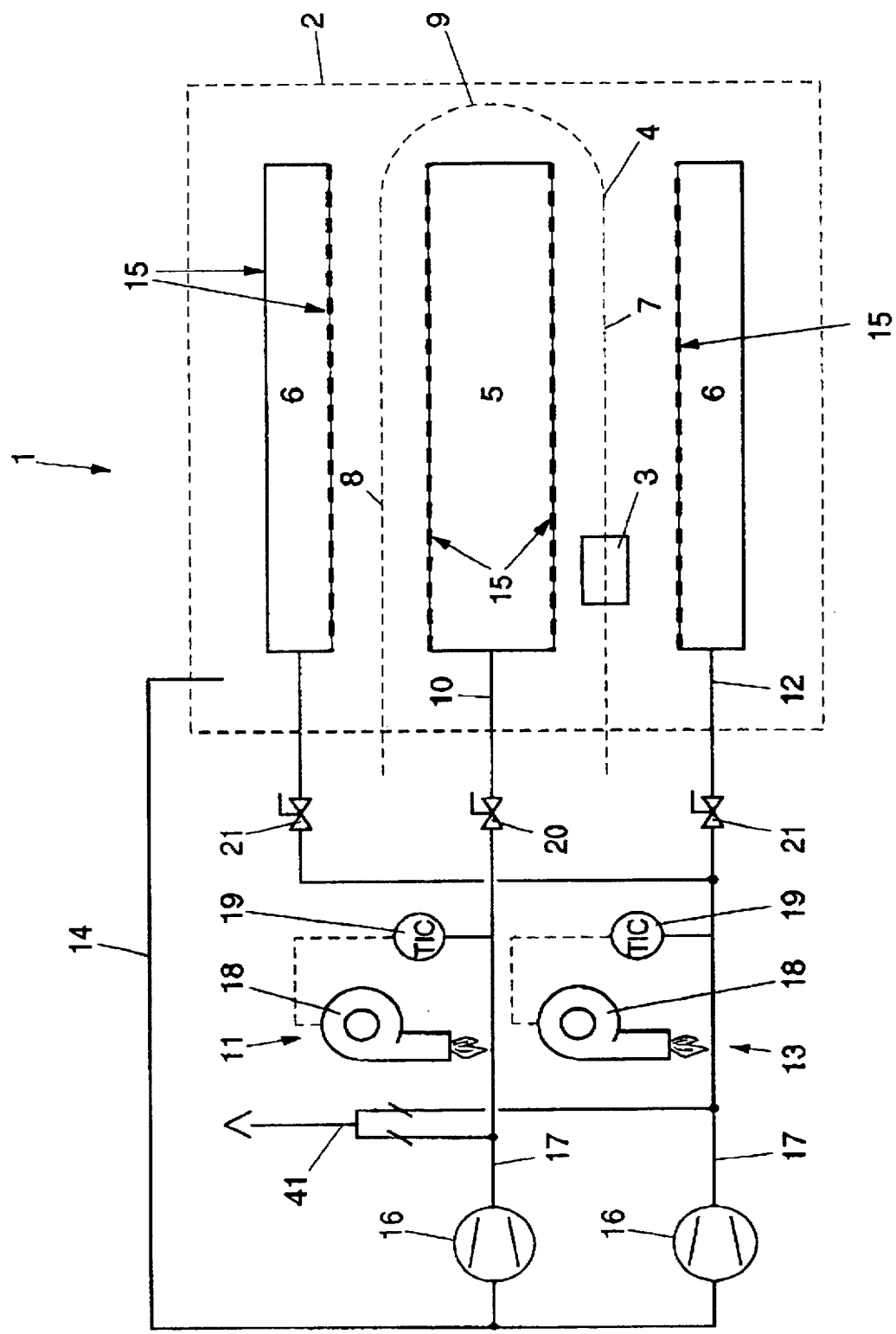
FIG. 1 is a control diagram of a baking oven with air heating.

FIG. 1 shows a control diagram of a baking oven 1, provided with hot air heating. Broken lines designate an oven space 2 in which a series of baking molds 3 are arranged. Each baking mold 3 defines in conventional manner, one or more mold cavities. The baking molds 3, when filled with dough, are passed through the oven space 2 along a circuitous pair of guide rails 4, and the moldings are meanwhile baked. Then the moldings are taken out, whereafter the baking molds 3 are filled again and passed back into the oven space 2.

One first air duct 5 and two second air ducts 6 extend through the oven space 2. The air ducts 6 are all disposed parallel to each other, with the first air duct 5 located between the second air ducts 6. The guide rails 4 run between the air ducts 5, 6, in such a manner that the first air duct 5 is substantially enclosed between a lower part 7, an upper part 8 and two end portions 9 of the track defined by the guide rails 4. The baking molds 3 are positioned on the guide rails in such a manner that the same part of the baking mold 3 is always directed towards the first air duct 5. Consequently, another part of the baking mold 3 is directed towards a second air duct 6.

A first supply line 10 is connected to the first air supply duct 5 at one end. The other end of the first supply line 10 connects to a first air conditioning device 11. The second air ducts 6 are jointly connected to a first end of second supply line 12. The other end of the second supply line 12 is connected to a second air conditioning device 13. The air conditioning devices 11, 13 will be further explained hereinafter. An air return line 14 extends from the oven space 2 to a supply side of the two air conditioning devices 11, 13. On their side(s) proximal to the baking molds, the air ducts 5, 6 are provided with a large number of uniformly distributed outlet openings 15, which are preferably jet nozzle-shaped and are directed perpendicularly to the direction of travel of the baking molds 3.

During use of the baking oven 1, air can be passed from the oven space 2 via the return line 14, the first air conditioning device 11 and the first supply line 10 to the first air duct 5, and via the return line 14, the second air conditioning device 13 and the second supply line(s) 12 to the second air ducts 6. For returning the return air, two return lines 14, for instance, can be arranged with a first return line 14 (not shown) being connected near the first air duct 5 and a second return line 14 (not shown) being connected near the second air duct 6. The advantage of this apparatus is that no mixing occurs during the return of the air. This prevents situations where in the case of large temperature differences between the air in the first air duct 5 and the second air duct 6, the air having the higher temperature is cooled too much by the air having the lower temperature and/or the air having the lower temperature is heated too much by the hotter air. This has important energetic advantages. For convenience, hereinafter only one return line 14 will be referred to, though two or more return lines can be used instead.

The air conditioning devices 11, 13 are equal at least in construction. Each air conditioning device 11, 13 comprises a circulation fan 16 which connects on one side to the return line 14 and on the other side to a guide tube 17. Terminating transversely to the guide tube 17 is a combined fan/heating device 18 which is actuated by a temperature control 19. At the first air conditioning device 11, the guide tube 17 connects via a first control valve 20 to the first supply line 10. At the second air conditioning device 13, the guide tube 17 connects, via two second control valves 21, to the second air ducts 6.

The heat control can be realized in different ways. For instance, the burner can be adjusted for supplying more or less heat to the air supplied via the return line 14 or the amount of air supplied to the air ducts 5 and 6 can be controlled. Further, the air temperature can be lowered by adding, for instance, relatively cold outside air.

Figure 2:
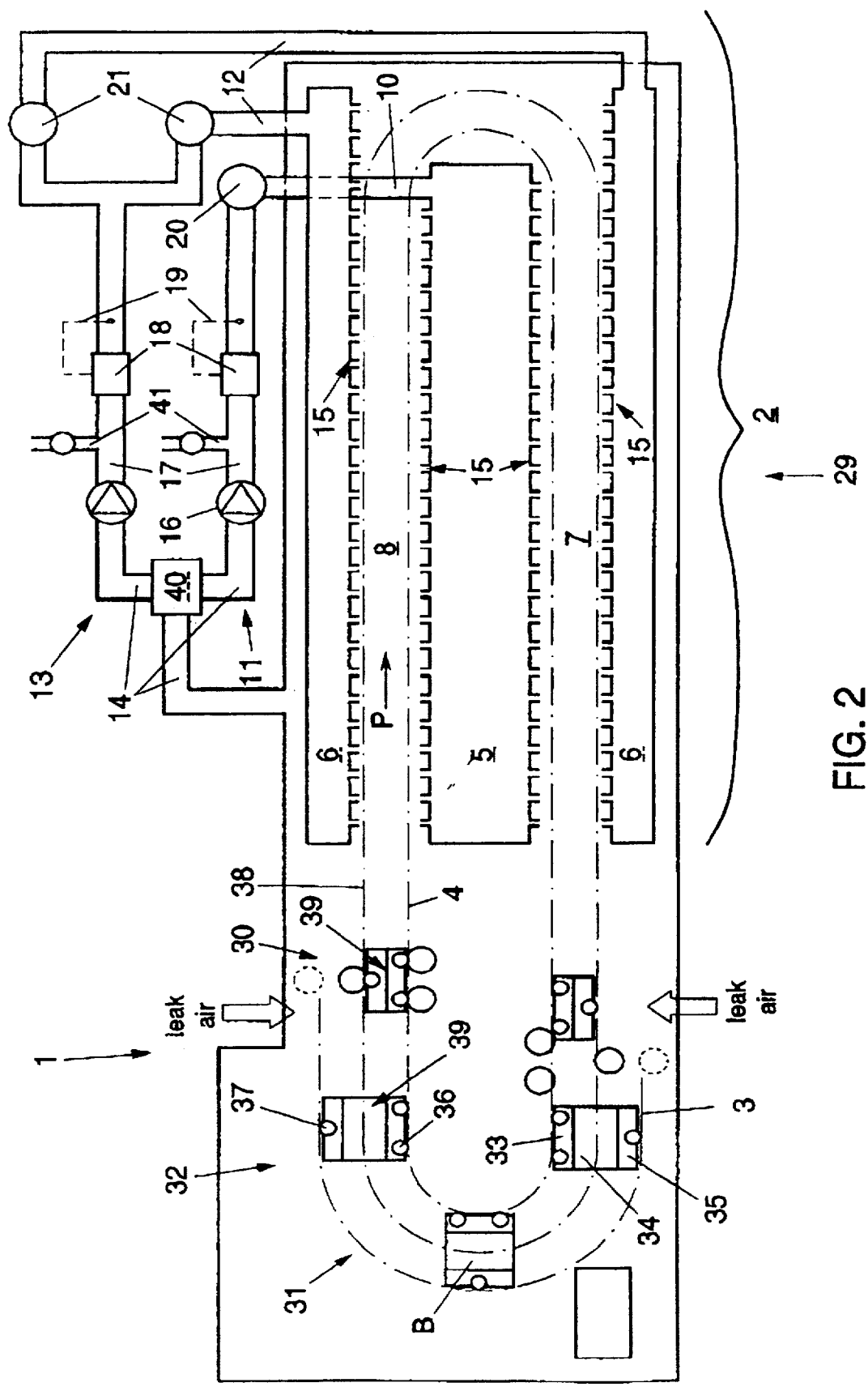
FIG. 2 is a sectional side elevation of a baking oven with air heating.

A baking oven 29 with a control diagram according to FIG. 1 is shown in FIG. 2 and can be used as follows.

FIG. 2 diagrammatically shows, in partly sectional side elevation, a continuous travel oven 1. The oven 1 is suitable for baking dish parts or similar moldings in a number of linked baking molds 3. In the oven 1, the baking molds 3 are circulated in the direction designated by the arrow P, with the baking molds 3 being passed successively through a closing station 30, a baking zone 2, a removal station 31, a filling station 32 and back again to the closing station 30.

Each baking mold 3 is made up of a first mold section 33 and a second mold section 35 connected thereto for pivotal motion on a pivot 34. The pivot 34 extends along one of the sides of the two mold sections 33, 35. The mold sections 33, 35 together form one or more baking forms B in the closed position of the baking mold 3. The first mold section 33 is provided with runners 36 by means of which the baking mold 3 can be guided over the rails 4 extending through the oven. The second mold section 35 comprises, on the side remote from the pivot 34, a guide roller 37 which can be guided through a guide rail 38 likewise extending through the oven.

Each baking mold 3 further comprises a locking mechanism 39, for instance a locking pin construction or a locking clamp by means of which the mold sections 33, 35 can be locked relative to each other. Opening and closing of the baking molds is effected automatically by means of the guide roller 37.

The baking molds are linked together, for instance by a drive chain. The drive chain is driven in a generally known way via a drive mechanism (not shown in the drawings), so that the baking molds 3 are pulled through the oven 1.

An opened baking mold 3 is fed to the filling station 32, where an amount of dough is provided in the baking mold. Then the baking mold 3 is passed to the closing station 30, with the second mold section 35 being pivoted in the direction of the first mold section 33. In the closing station 30 the baking mold is pressed shut and locked.

For the purpose of heating the baking molds 3 in the baking zone 2, in the oven a first air duct 5 is arranged between the upper 8 and lower part 7 of the track defined by the rails 4, and second air ducts 6 are arranged above the upper 8 and under the lower part 7 of the track. The first air duct 5 and the second air duct 6 extend in the longitudinal direction of the rails 4 over the entire width of the baking molds 3. The sides of the air ducts 5, 6 proximal to the baking molds are provided with a large number of outlet openings 15 which are of jet nozzle shape and are arranged, for instance, in rows and lines.

Included on top of the oven are the first 11 and second air conditioning device 13, which are connected as depicted in the diagram shown in FIG. 1. Since these air conditioning devices are arranged above the oven, the available space is optimally used. In the embodiment shown in FIG. 2 the combined fan/heating means 18 included in the air conditioning devices comprise a gas-fired burner and a fan, but naturally it is also possible to choose a different kind of heating of the air, such as for instance electrical heating, induction and the like. The temperature control consists, for instance, of a temperature sensor, setting means and control means and can be built up in a manner known to a person skilled in the art.

In the embodiment shown in FIG. 2, the return line 14 includes an air collecting chamber 40 from which the circulation fans 16 draw in the air. Excess of air resulting, for instance, from leakage air and combustion, can be discharged via the stack 41.

As appears from FIG. 2, the first section 33 of each baking mold always remains directed towards the first air duct 5 and the second section 35 towards a second air duct 6. As a consequence, inter alia the temperature, the amount and the flow velocity of the supplied air in each air duct 5, 6 can be optimally adapted to the relevant section 33, 35 of the baking molds 3. This makes it possible to compensate and adjust the flow velocity, amount, and temperature of the supplied air in a simple manner. The oven space 2 is efficiently provided with a heat insulating jacket.

During use of the oven, efficient use is made of leakage air which flows in, for instance, through gaps between the oven plating and the inlet and outlet side of the oven zone. With this leakage air, air losses are compensated, so that pressure differences are prevented and moreover an efficient temperature control is enabled in a simple manner.

During use of the oven for baking, for instance, dish parts from a starch-rich dough suspension, temperatures of, for instance, 300° C. on the outside of the mold are set, whereby a baking temperature of about 200° C. on the inside of the mold is achieved. In the known ovens, the external temperature would locally have to be much higher than 400° C. This temperature may even be around 1000° C. In particular when springs and the like are used for closing the baking molds and keeping them closed, this temperature is often unacceptable. The maximum process temperature is preferably less than 350° C. Moreover, by means of the hot air heating according to the invention, it is simple to achieve a temperature difference of, for instance, less than 5° C. between the mold sections 33, 35 of one baking mold. Also when different baking molds are used, for instance different in structure or manufactured from different materials, optimum temperatures can always be achieved.

The high temperatures of, for instance, 1000° C. to be achieved in the known apparatus have other disadvantages in addition to the energetic disadvantage. For instance, for lubricating the bearings on which the baking molds are passed through the oven and the other moving parts of the baking molds, special, for instance teflon-based, lubricants have to be used. Such special lubricants are less desirable in the food industry or are even considered unacceptable. Moreover, these lubricants are relatively expensive. Further, the strength properties of the materials and constructions used in the known apparatus are adversely affected as a result of the high temperatures. For instance, the material properties change markedly, and heavier, stiffer constructions have to be used. In particular when spring means are used in the mold and baking oven, greater closing forces will have to be used for obtaining a proper closure of the molds. Further, the drive means, such as motors, chains and return gears, have to be made of heavier construction, so that the speed of travel of the baking molds through the oven is adversely affected. This leads to a lower yield and moreover relatively much space is occupied by the molds, both during use and during storage, so that the known apparatus is specially uneconomic. Since in the method and apparatus according to the invention, lower maximum temperatures will occur in the oven, the above-mentioned problems are avoided.

Since the air is forced through the jet nozzle-shaped openings 15 by means of the fans, and return air is additionally heated, the baking molds are heated in an energetically economic way. Moreover, the baking molds 3 are heated simultaneously from above and from below, so that a maximum heating length is achieved within a given oven length. This means that the efficiency of the oven according to the invention is many times higher than that of known ovens of comparable capacity, the more so since less failure occurs, the oven is out-of-service less often and less long and heating and cooling times are shortened. Moreover, as a result of the better heating, the speed of travel of the baking molds can be increased.

After the products have been baked in the baking zone 2, the baking mold 3 is passed into the removal station 31, where the baking mold 3 is opened and the baked products are removed from the baking forms B. Then the baking mold is guided further in open condition to the filling station 32, and a next baking cycle is initiated.

The filling station 32, the closing station 30 and the removal station 31 are all arranged at one end of the oven and located at one end portion 9 of the track referred to.

Figure 3:
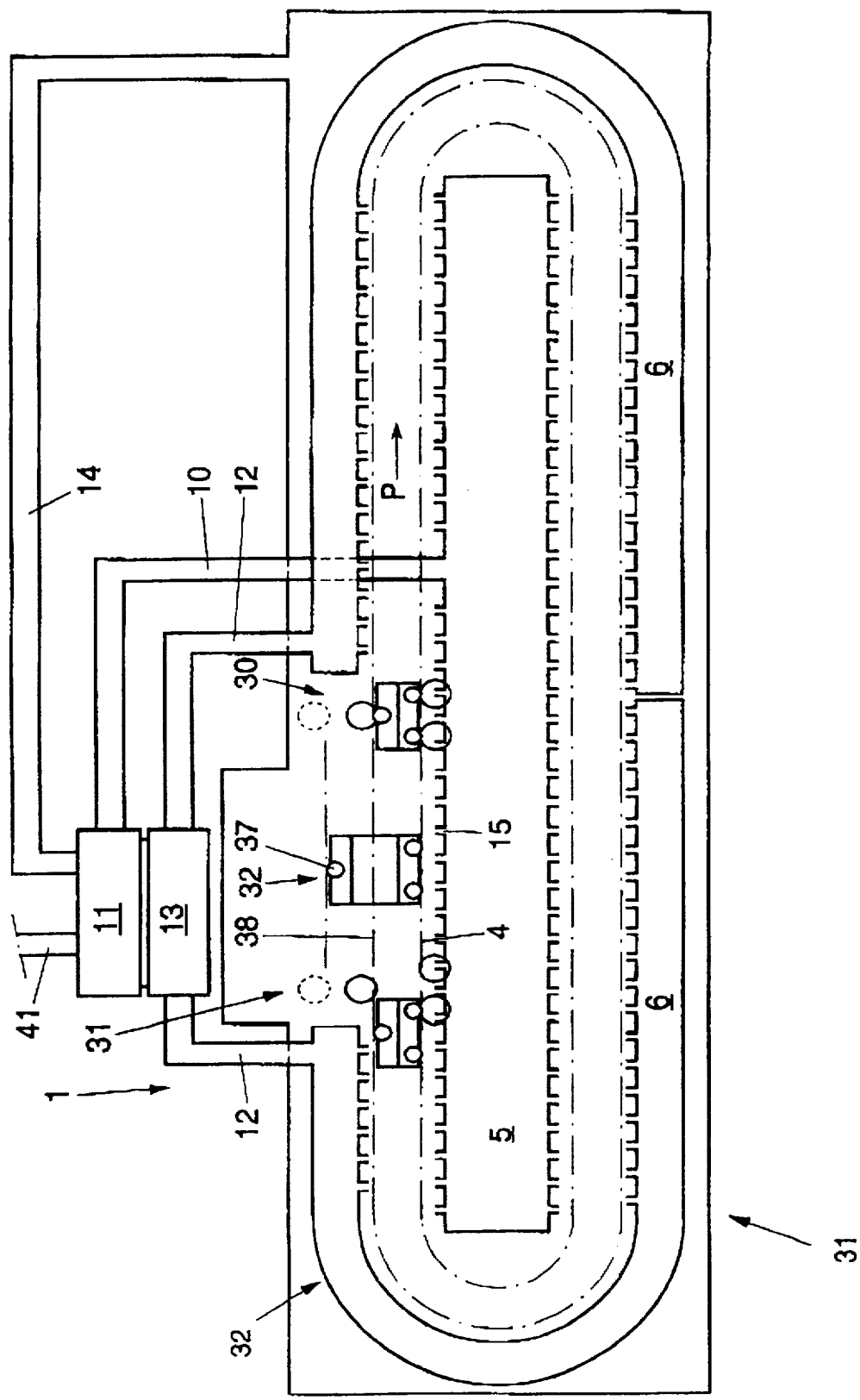
FIG. 3 is a sectional side elevation of an alternative embodiment of a baking oven with air heating.

FIG. 3 shows an alternative embodiment of a baking oven according to the invention. In this embodiment the filling station 32, the closing station 30, and the removal station 31 are all included in a middle portion of the oven. As a result, the residence time of the different mold sections outside the heated zone of the oven, and the distance therefrom to the second mold section 35 in particular, are shortened, so that energy losses resulting in particular from cooling of the baking molds are reduced and hence the efficiency is increased. However, in particular the removal of the dish parts is thereby rendered somewhat more difficult.

Figure 4:
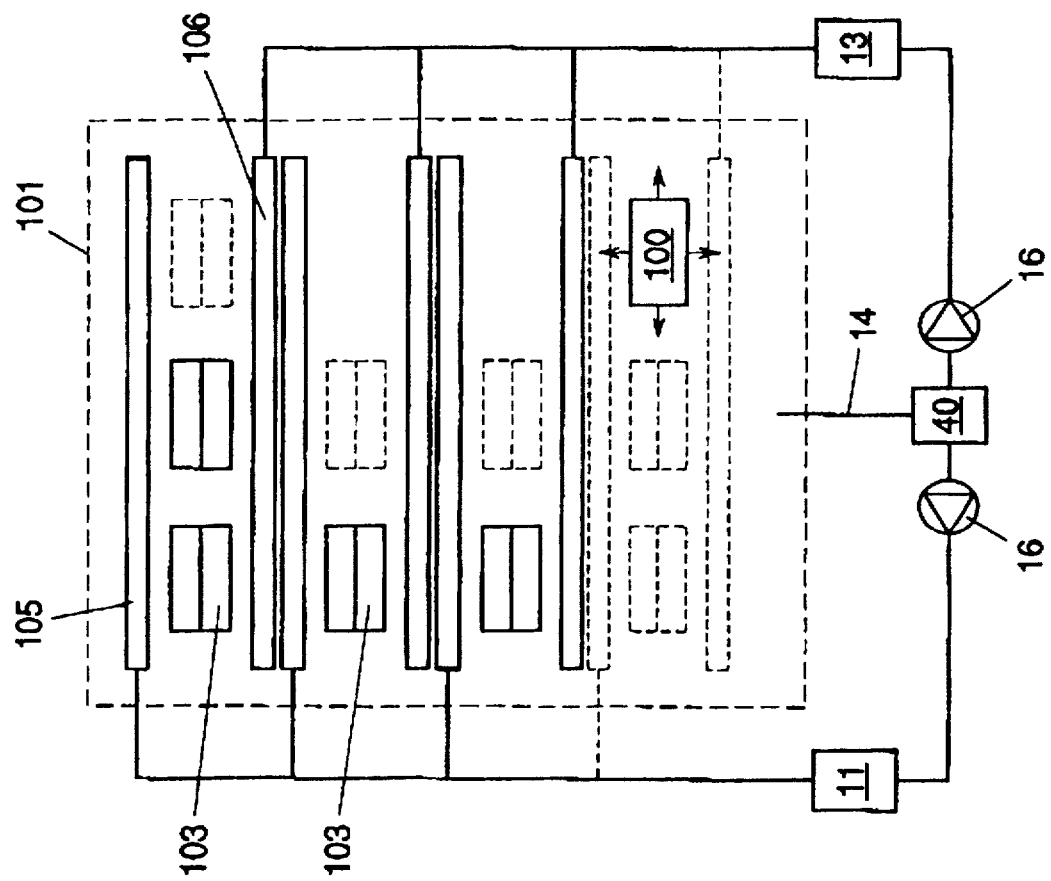
FIG. 4 is a control diagram for a further alternative embodiment of a baking oven with air heating.

FIG. 4 gives a control diagram for a further alternative embodiment of a baking oven 101 according to the invention, in which the different baking molds 103 are arranged at least semi-stationarily and a removal/filling station 100 is moved along the different molds. The baking molds 103 are individually or groupwise provided with a first 105 and a second air supply duct 106 which are provided with heated air in the manner described in the foregoing. In an oven 101 designed in such a manner, it is also possible in a simple manner to simultaneously use baking molds that, for instance, have a different heat demand, so that different products can be produced side by side. Moreover, the baking molds 103 substantially do not cool during filling and removal, so that heat losses are minimized and the temperature of the baking molds can be individually set and adjusted, so that the process conditions can be controlled optimally. Further, only few moving parts are necessary, so that wear is reduced. A further advantage of the embodiment of the oven according to FIG. 4 is that during use some molds can be turned off or skipped. As a consequence, the production capacity can be accurately adapted to the demand in terms of numbers as well as type of product. Moreover, during the process, baking molds can be taken out, replaced, serviced, cleaned and the like without the necessity of interrupting the baking process for that purpose.

The invention is not in any way limited to the embodiments described. The baking molds can for instance comprise all kinds of mold sections movable relative to each other in different ways, and the baking molds can be circulated in different ways through different types of ovens, for instance through a circular oven. The pattern of the outlet openings and the shape of the air ducts can be adapted to specific needs. Further, it is for instance possible to fit each air duct with its own fan and its own air heating means; to dispense with recirculation of the heated air while using the residual heat, for instance, for other purposes in the production process or for space heating; and to provide more air ducts, for instance along the sides of the baking molds, or air ducts divided into different compartments. These and many other modifications are possible within the framework of the invention.

We claim:

1. A baking oven comprising:
   a) a number of baking molds for baking moldings; and
   b) heating means for heating the baking molds, the heating means comprising
      i) air heating means, and
      ii) air displacement means, the air displacement means being arranged for forcibly passing air heated by the air heating means along the baking molds within the oven,
   wherein the air displacement means comprise
      A) at least one fan, and
      B) at least one air supply duct coupled with the fan, the at least one air supply duct
         1) extending within the oven along at least a number of baking molds, and
         2) being provided with outlet openings,
   wherein an air supply path extends from the air heating means, via (i) the at least one fan, (ii) at least a part of the air supply duct and (iii) a number of the outlet openings, to the external surface of at least a number of baking molds, and wherein, within the oven, first and second air supply ducts of the at least one air supply duct extend along at least two sides of the baking molds.

2. A baking oven according to claim 1, wherein the first and second air supply ducts extend on opposite sides of the baking molds, wherein the air displacement means include a fan associated with each of the first and second air supply ducts, wherein the air heating means include separate air heating means thermally coupled with an associated one of the first and second air supply ducts, and wherein an air temperature and an air flow rate are separately controllable in each of the first and second air supply ducts.

3. A baking oven comprising:
  a) a number of baking molds for baking moldings;
  b) heating means for heating the baking molds, the heating means comprising
    i) air heating means, and
    ii) air displacement means, the air displacement means being arranged for forcibly passing air heated by the air heating means along the baking molds within the oven,
    wherein the air displacement means comprise
      A) at least one fan, and
      B) at least one air supply duct coupled with the fan, the at least one air supply duct
        1) extending within the oven along at least a number of baking molds, and
        2) being provided with outlet openings,
    wherein an air supply path extends from the air heating means, via (i) the at least one fan, (ii) at least a part of the air supply duct and (iii) a number of the outlet openings, to the external surface of at least a number of baking molds; and
  c) a guide track along which the baking molds are passed through the oven in succession thereby defining a direction of travel, wherein each of the at least one air supply duct extends along the guide track in the direction of travel and wherein the outlet openings are directed substantially transversely to the direction of travel.

4. A baking oven according to claim 3, wherein the baking molds are arranged in a linked series in the oven, each baking mold comprising a first and a second mold section, the first mold section of each baking mold comprising guide means by which the baking mold can be guided over the guide track, wherein a first air supply duct of the at least one air supply duct extends on a side of a baking mold adjacent to its first mold section and a second air supply duct of the at least one air supply duct extends on a side of a baking mold adjacent to its second mold section.

5. A baking oven according to claim 4, wherein the guide track comprises at least two interconnected parts arranged above each other, along which the series of baking molds is guidable.

6. A baking oven comprising:
  a) a number of baking molds for baking moldings; and
  b) heating means for heating the baking molds, the heating means comprising
    i) air heating means, and
    ii) air displacement means, the air displacement means being arranged for forcibly passing air heated by the air heating means along the baking molds within the oven,
    wherein the baking molds are stationarily arranged and comprise individually or groupwise controllable heating means.

7. A baking oven comprising:
  a) a number of baking molds for baking moldings, each of baking mold defining a series of mold cavities;
  b) heating means for heating the baking molds, the heating means comprising
    i) air heating means, and
    ii) air displacement means, the air displacement means being arranged for forcibly passing air heated by the air heating means along the baking molds within the oven; and
  c) a series of dough injectors arranged for introducing dough into the mold cavities.

8. The baking oven of claim 7 wherein the number of dough injectors corresponds to a maximum number of mold cavities in the baking molds.

9. A method for baking moldings from dough or dough suspensions in baking molds in an oven, the method comprising steps of:
  a) introducing into a baking mold, during normal use of the oven, an amount of dough or dough suspension;
  b) closing the baking mold;
  c) heating the baking mold in the oven, by forcibly supplying heated air, such that the molding in the baking mold is baked;
  d) removing the baked molding from the baking mold; and
  e) refilling the baking mold,
  wherein the step of heating the baking mold includes sub-steps of
    i) blowing heated air towards the baking molds from at least two sides, and
    ii) controlling a temperature of the blown air on each side, the temperature of the blown air being adapted to at least a heat capacity of a side of the baking mold proximal to a relevant side of air approach and a heat demand of the molding to be baked.

10. A method for baking moldings from dough or dough suspensions in baking molds in a baking space of an oven, the method comprising steps of:
  a) introducing into a baking mold, during normal use of the oven, an amount of dough or dough suspension;
  b) closing the baking mold;
  c) heating external to the baking space of the oven, air;
  d) heating the baking mold in the oven, by forcibly supplying heated air, such that the molding in the baking mold is baked;
  e) removing the baked molding from the baking mold;
  f) refilling the baking mold;
  g) discharging, from the oven, upon heat exchange with the baking molds, at least a substantial portion of the blown air;
  h) returning the discharge air, via air heating means, to a blowing side of the oven; and
  i) mixing the returned air with ambient air upstream of the air heating means, such that a temperature of the air which is supplied to the air heating means is always lower than a minimum air temperature desired in the oven,
  wherein the forcibly supplied air is blown into the oven.

11. A method for baking moldings from dough or dough suspensions in baking molds, at least some of which have a series of defined mold cavities, in an oven, the method comprising steps of:

a) introducing into a baking mold, during normal use of the oven, an amount of dough or dough suspension;

b) closing the baking mold;

c) heating the baking mold in the oven, by forcibly supplying heated air, such that the molding in the baking mold is baked;

d) removing the baked molding from the baking mold;

e) refilling the baking mold; and f) determining, depending on at least the mold temperature, in each baking cycle, which of the mold cavities is or are filled.

* * * * *